United States Patent [19]

Thomas

[11] Patent Number: 5,513,892
[45] Date of Patent: May 7, 1996

[54] SUN GLARE SHIELD

[76] Inventor: James P. Thomas, 14 Birdie La., Flying Hills, Pa. 19607

[21] Appl. No.: 283,182

[22] Filed: Aug. 3, 1994

[51] Int. Cl.[6] .................................................. B60J 3/06
[52] U.S. Cl. ......................... 296/97.2; 296/97.8; 359/502; 359/614
[58] Field of Search ..................... 296/97.6, 97.8, 296/97.2; 359/601, 614, 502, 888, 889, 892

[56] References Cited

U.S. PATENT DOCUMENTS

| | | | |
|---|---|---|---|
| 1,982,511 | 11/1934 | Geist | 296/97.2 |
| 1,990,143 | 2/1935 | Snow | 359/614 X |
| 2,204,691 | 6/1940 | Olsen | 296/97.2 |
| 2,220,429 | 11/1940 | Soderberg | 296/97.2 |
| 2,228,209 | 1/1941 | Harrrington | 296/97.8 |
| 2,458,125 | 1/1949 | Winkler | 296/97.2 |
| 2,528,038 | 10/1950 | Crise | 359/888 |
| 2,733,763 | 2/1956 | Nygaard | 296/97.8 |
| 3,383,132 | 5/1968 | Stamp | 296/97.6 |
| 3,475,080 | 10/1969 | Shumway | 296/97.2 X |
| 4,323,275 | 4/1982 | Lutz | 296/97.8 |
| 4,528,232 | 7/1985 | Cliffe | 296/97.2 |
| 4,978,160 | 12/1990 | Welschoff | 296/97.8 |
| 4,988,139 | 1/1991 | Yamada | 296/97.8 X |
| 5,020,533 | 6/1991 | Hubbard et al. | 2/9 |

FOREIGN PATENT DOCUMENTS

| | | | |
|---|---|---|---|
| 1480584 | 9/1969 | Germany | 296/97.2 |
| 2449824 | 4/1976 | Germany | 296/97.2 |
| 49514 | 3/1983 | Japan | 296/96.19 |
| 63420 | 3/1989 | Japan | 296/97.2 |
| 3239629 | 10/1991 | Japan | 296/97.8 |
| 328554 | 4/1930 | United Kingdom | 296/97.2 |

OTHER PUBLICATIONS

Llumar Auto Film, At-55PS, Brochure, Two Pages, Undated.
Polaroid Polarized Glare Shiged Brochure, one Page, Undated.

*Primary Examiner*—Dennis H. Pedder
*Attorney, Agent, or Firm*—Robert E. Bushnell

[57] ABSTRACT

An extendable automobile sun glare shield may be constructed with a body of opaque material with a shield of polaraized material having a film of black glass covering the upper section of the shield slidably disposed to extend and retract from a cavity disposed within the body of opaque material.

20 Claims, 4 Drawing Sheets

SUN GLARE SHIELD

BACKGROUND OF THE INVENTION

1. Field of the Invention

The present invention relates to improvements in automobile sun visors.

2. Description of the Prior Art

Automobile sun visors serve to shade the eyes of a vehicle occupant from destructive components of visible light, namely direct sun light and glare produced by reflections of sun light. Generally, automobile sun visors consist of non-transmissive sheets of material positioned between the occupant of the automobile and the sun light directed toward the occupant's eyes. Nearly all automobile sun visors are pivotable so they can be pivoted away from the occupant's line of vision, if the occupant desires.

Many attempts have been made to modify the general form of the automobile sun visor to assist a vehicle occupant in avoiding irritating sun light and reflected glare from directly entering his eyes.

Externally applied extentions have been produced to increase the effective area of an automobile sun visor. Barnhart (U.S. Pat. No. 3,853,370), discloses a sun visor extension for vehicles. The extension consists of a clamping base designed to attach to an automobile sun visor, with a retractable and extendable visor sheet attached to the clamping base. The sun visor extension allows an occupant to effectively increase the size of an existing automobile sun visor by extending the visor sheet. The visor sheet may be either opaque or tinted. A completely opaque visor sheet is employed to assist an occupant who sits low in the vehicle in completely shading his eyes from direct sun light. A tinted visor sheet may be utilized to shade an occupant's eyes from sun light when the sun is low on the horizon.

Karford (U.S. Pat. No. 4,792,176), shows an extension unit for a sun visor. The extension unit includes two shields and is externally applied to an automobile sun visor. One shield is opaque and may be extended in a horizontal direction to block irritating light from entering an occupant's eyes. The other shield may be either tinted, polarized or completely opaque, and may be extended and retracted in the vertical direction to block the passage of light from entering an occupant's eyes or to reduce glare, depending on whether the shield is constructed of tinted, polarized or completely opaque material.

Although certain improvements to automobile sun visors have been attempted, I have discovered that they have many drawbacks and do not address various problems. Externally applied sun visor extension units are costly and inconvenient. These extension units must incorporate fastening devices, such is clamping bases or adhesive type surfaces, which drive up the production cost. Additionally, as a result of external application, the externally applied extension units add uncontemplated weight and increase the thickness of the existing automobile sun visor. Consequently, an automobile sun visor having an extension unit attached to it does not properly rest against the roof of the vehicle when pivoted out of the occupant's line of vision, and may undesireably fall or pivot back into the occupant's line of vision as a result of the added weight produced by the extension unit. Moreover, the previously discussed extension units do not allow an occupant to simultaneously block direct sunlight from being directly transmitted to his eyes, substantially inhibit sun light from being directly transmitted to his eyes and view objects through a transparent, polarized glare shield.

SUMMARY OF THE INVENTION

Accordingly, it is an object of the present invention to provide an improved, extendable sun glare shield.

It is another object to reduce cost, weight and thickness by providing a fully integrated sun visor with a retractable and extendable shield.

It is yet another object to enable a vehicle's occupant to look directly at the sun, or continue focusing on objects in his path without suffering momentary vision impairment.

It is still another object to allow a vehicle's occupant to focus on objects in his path while the sun is in the horizon in front of the occupant, without suffering momentary vision impairment.

It is still yet another object to provide an extendable sun glare shield that allows the occupant of a vehicle to simultaneously completely block unwanted sunlight with an opaque material, effectively block unwanted sun light with a slightly transmissive material and reduce glare through a polarized material.

It is a further object to provide a device and process for enhancing vehicular safety within intersections controlled by illuminated traffic lights.

These and other objects may be achieved with an extendable sun glare shield may be constructed according to the principles of the present invention preventing visible sunlight from being directly transmitted to a vehicle occupant's eyes and filtering glare produced by reflective visible light. A body of opaque material having a cavity disposed within the body and an opening formed on the lower edge of the body is pivotably mounted to a rod positioned between the windshield of the vehicle and the seat of the vehicle. A shield of polaraized material having an upper section of black glass material with a predetermined index of refraction value affixed to the shield, for substantially inhibiting visible light from being directly transmitted to an occupant's eyes, and an exposed lower section of the polarized material having a predetermined index of refraction lower than the predetermined index of refraction value of the upper section, for filtering glare produced by reflected visible light, is slidably disposed within the cavity. The shield may be positioned in various locations within the cavity of the body, including an extended position for exposing both the upper section and lower section of the shield, and a retracted position in which the shield is substantially disposed within the cavity of the body.

Other details, objects and advantages of the invention will become apparent as the following description of certain present preferred embodiments thereof, present prefered method manufacturing the invention, and a present prefered method of practicing the same proceeds.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
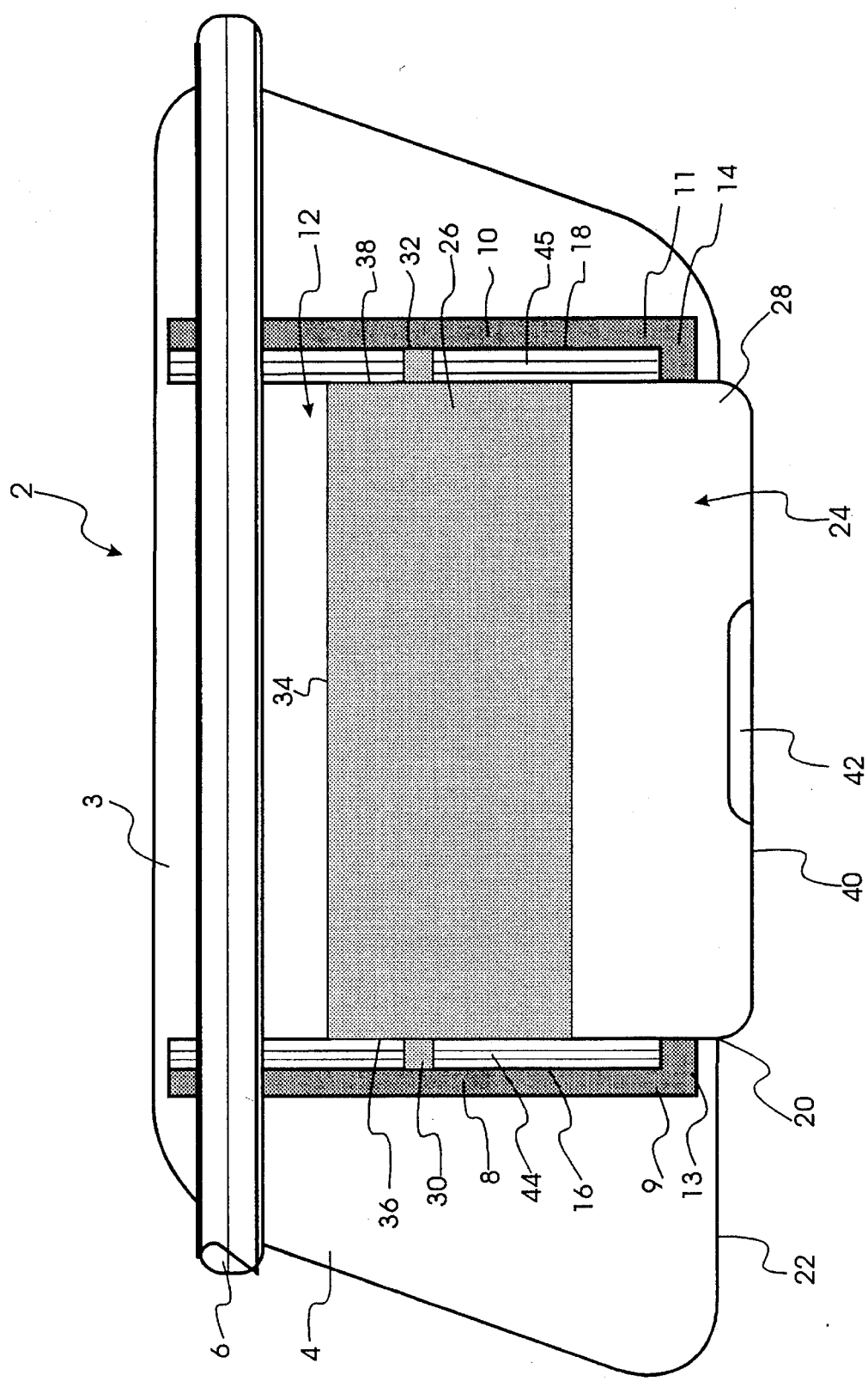
FIG. 1 is a diagram depicting the extendable sun glare shield in a fully retracted position.
Figure 2:
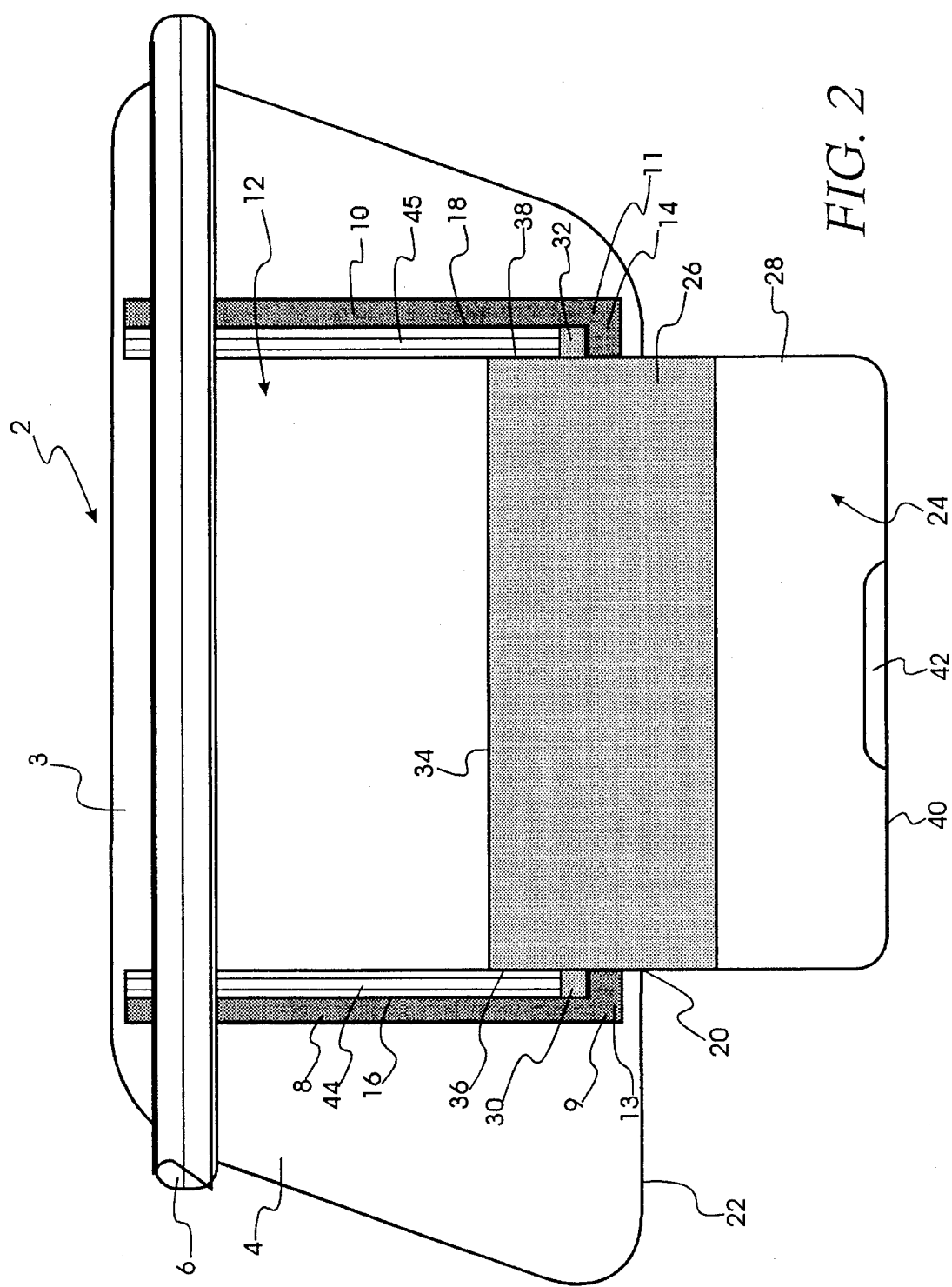
FIG. 2 is a diagram depicting the extendable sun glare shield in a fully extended position.
Figure 3:
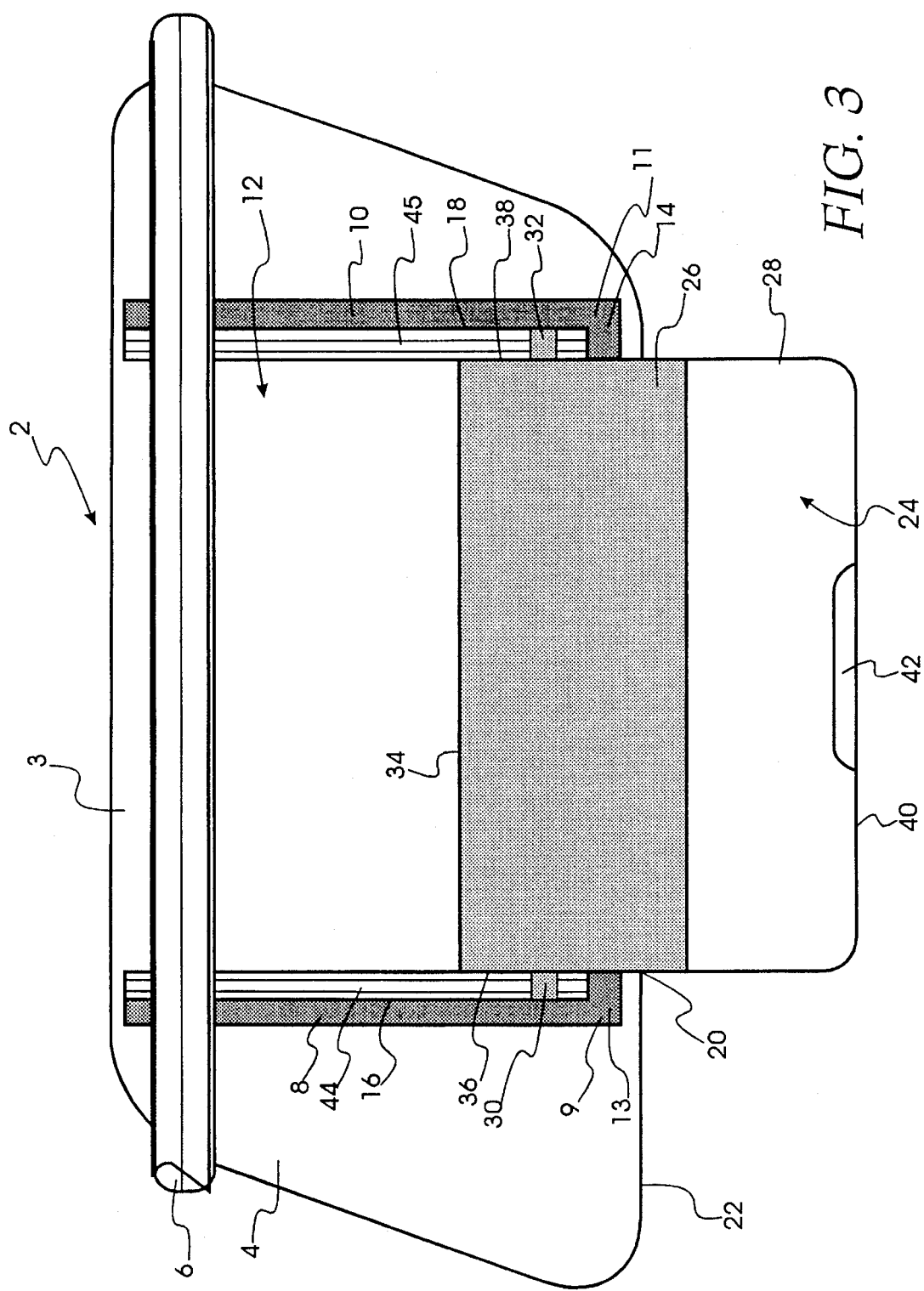
FIG. 3 is a diagram depicting the extendable sun glare shield positioned between the fully extended position and the fully retracted position.
Figure 4:
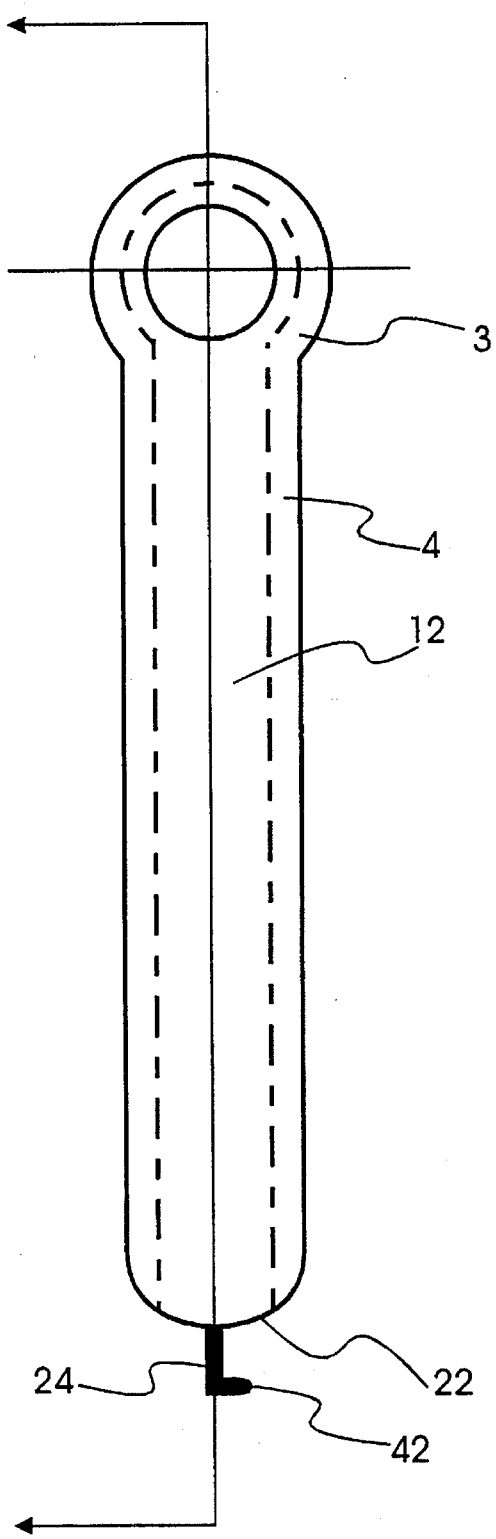
FIG. 4 is a side view of the extendable sun glare shield.

Turning now to the drawings, and referring to FIG. 1, an extendable sun visor is generally depicted by the reference numeral 2. The body 4 of the extendable sun visor 2 may be constructed of a rigid or semi-rigid, opaque material and has a generally flat surface. The body 4 is pivotably mounted to the rod 6, which is typically fixed at an upper portion of a vehicle between the wind shield of the vehicle and the occupant's seat. Interior edges 8 and 10 having protrusions 13 and 14 extending from the lower ends 9 and 11 of the interior edges 8 and 10, are completely disposed within the body 4. The body 4 also has a cavity 12 completely disposed within and extending to boundries 16 and 18 created by interior edges 8 and 10. The cavity 12 extends through an opening 20 in the lower edge 22 of the body 4.

Shield 24 is a flat sheet of polarized material which may be constructed of a polarizing filter laminated between two sheets of rigid, optical quality Acrylic, plastic or glass. A polarizing filter, such as a Polaloid® Glare Shield, which filters up to ninety nine percent of reflected light glare rays may be utilized for shield 24. The upper section 26 of the shield 24 is covered by black glass material which has a predetermined index of refraction value for substantially inhibiting visible light from being transmitted throught the section. The black glass material may consist of a sheet of LLumar® AT-5 SPS Auto Film manufactured by Martin Processing, Inc., which transmits five percent of visible light and reflects five percent of visible light.

The lower section 28 has the polarized material of the shield 24 extending from and positioned adjacent to the upper section 26. Lower section 28 has a predetermined index of refraction value lower than the predetermined index of refraction value for the upper section 26, to filter any glare produced by reflected visible light from encountering the occupant's eyes. Interlocking protrusions 30 and 32 are formed near the distal edge 34 of the shield along the longitudinal edges 36 and 38 of the shield 24. A handle 42 is positioned along and extends from the proximate edge 40 of the shield 24. Springs 44 and 45, which, for example, may be leaf springs, are positioned to extend along interior edges 8 and 10 within the cavity 12 between the shield 24 and the body 4 to produce friction between the shield 24, the body 4 and springs 44 and 45.

In its intended mode of operation, an occupant of a vehicle pivots the body 4 of the extendable sun visor to a down position. The occupant then extends the shield 24 by grasping the handle 42. As the shield 24 is extended, interlocking protrusions 30 and 32 slide toward the lower edge 22 of the body and finally rest against protrusions 13 and 14 located at the lower ends 9 and 11 of interior edges 8 and 10 when the shield 24 is in a fully extended position. To retract the shield 24, the occupant merely needs to apply pressure to the proximate edge 40 of the shield 24 and force the shield 24 into the cavity 12. While the shield 24 is retracted, the springs 44 and 45 prevent the shield 24 from sliding toward the lower ends 9 and 11 of the interior edges 8 and 10. While the shield 24 is extended, the springs 44 and 45 prevent the shield 24 from sliding towards the upper portion 3 of the body 4. Material other than springs may be used to retard the descent of shield 24 and to hold a partially lowered shield 24 at a desired position.

The upper section 26 of the shield 24 inhibits a substantial portion of sunlight. In the preferred mode of operation however, external light is not completely inhibited by the upper section 26. The size of shield 24 assures that when it is fully lowered, the sun will drop below the horizon before becoming visible beneath the lower edge of section 28. A vehicle's occupant may distinguish for example, the location of the sun, and see and distinguish the color of traffic lights through upper section 26; consequently, a motorist who is either approaching or is stopped by a traffic light at an intersection, can easily see both the traffic light and its housing, as well as the color of the illuminated traffic light lens through upper section 26, even thought the sun is within the field of vision of the motorist and positioned behind the traffic light. This feature provides a significant improvement in traffic safety at intersections controlled by traffic lights.

It is preferrable that shield 24 be positioned within a sun visor, rather than outside of the visor, in order to assure that when first needed, the surfaces of shield 24 are clean, free of vehicle and road dust, free of scratches and surface blemishes, and ready for instanteous use.

While I have shown and described certain present preferred embodiments of the invention and have illustrated certain present preferred methods of constructing and practicing the same, it is to be distinctly understood that the invention as not limited thereto but may be otherwise variouly embodied and practiced within the scope of the following claims.

I claim:

1. An extendable sun glare shield mounted upon a rod positioned between a windshield of a vehicle and a seat of said vehicle, for impeding visible light from being directly transmitted to an occupant's eyes and filtering glare produced by reflected visible light, comprising:

a body of opaque material having an upper portion, a lower edge, an opening formed on said lower edge and a cavity disposed within said body and accessible through said opening, said upper portion of said body being pivotally mounted to said rod;

a black material transmitting substantially five percent of visible light and having first predetermined index of refraction value; and a shield of polarized material having an upper section extending between opposite lateral edges of said shield, said upper section being completely covered by said black material affixed to said shield, said black material and said shield in combination enabling the occupant to distinguish objects through said upper section while the objects are aligned in substantially the same line of sight as the sun without momentary vision impairment, said shield of polarized material having a lower section extending from and positioned adjacent to said upper section, said lower section having a second predetermined index of refraction value lower than said first predetermined index of refraction value, for filtering said glare produced by said reflected visible light, a distal edge extending along a periphery of said upper section parallel to and opposite from said lower section and a proximate edge extending along a periphery of said lower section parallel to and opposite from said distal edge, said shield being slidably disposed within said cavity and adjustable to be located at a plurality of positions within said cavity relative to said body, including to an extended position with said distal edge of said shield remaining fastened in said body and said upper section and said lower section of said shield extending through said opening and protruding from said body and a retracted position with said shield being substantially disposed within said cavity with said proximate edge protruding through said opening.

2. An extendable sun glare shield as claimed in claim 1, in which said body further comprises:

a first interior edge for forming a first boundry between said said body and said cavity, having a first lower end, a first longitudinal axis and a first protrusion extending from said first lower end perpendicular to said first longitudinal axis, wherein said first interior edge is disposed within said body with said first longitudinal axis perpendicular to said lower edge of said body and said first lower end opposite said upper portion of said body; and a second interior edge for forming a second boundry between said said body and said cavity, having a second lower end, a second longitudinal axis and a second protrusion extending from said second lower end perpendicular to said second longitudinal axis, wherein said second interior edge is spaced apart from said first interior edge and disposed within said body with said second longitudinal axis perpendicular to said lower edge of said body and said second lower end opposite said upper portion of said body.

3. An extendable sun glare shield as claimed in claim 2, in which said shield further comprises:

a first longitudinal edge perpendicular to said distal edge and said proximate edge of said shield;

a second longitudinal edge opposite said first longitudinal edge, perpendicular to said distal edge and said proximate edge of said shield;

a first interlocking protrusion positioned on said upper section of said shield and extending from said first longitudinal edge of said shield, for sliding along said first interior edge of said cavity and interlocking with said first protrusion to prevent said shield from sliding out of said cavity while said shield is in said extended position; and a second interlocking protrusion positioned on said upper section of said shield and extending from said second longitudinal edge of said shield, for sliding along said second interior edge of said cavity and interlocking with said second protrusion to prevent said shield from sliding out of said cavity while said shield is in said extended position.

4. An extendable sun glare shield as claimed in claim 3, further comprising:

spring means positioned within said cavity to contact said body and said shield, said spring means being biased to create a force inhibiting said shield from sliding freely within said cavity.

5. An extendable sun glare shield as claimed in claim 3, further comprising:

a first leaf spring positioned within said cavity between said shield and said body, biased to urge said shield against said body and create a frictional force between said shield, said body and said first leaf spring inhibiting said shield from sliding freely within said cavity.

6. An extendable sun glare shield as claimed in claim 5, further comprising:

a second leaf spring spaced apart from said first leaf spring and positioned within said cavity between said shield and said body, biased to urge said shield against said body and create a frictional force between said shield, said body and said second leaf spring inhibiting said shield from sliding freely within said cavity.

7. An extendable sun glare shield as claimed in claim 1, wherein said black material comprises a sheet of film.

8. An extendable sun glare shield as claimed in claim 1, wherein said polarized material comprises a polarizing filter for filtering up to ninety-nine percent of said glare produced by said reflected visible light.

9. An extendable sun glare shield for impeding visible light from being directly transmitted to an occupant's eyes and filtering glare produced by reflected visible light in a vehicle having a rod positioned between a windshield of said vehicle and a seat of said vehicle, comprising:

a body of flat, completely opaque material having an upper portion, a lower edge, a slot formed on said lower edge and a rectangular shaped cavity disposed within said body and extending through said slot to form a first interior edge and a second interior edge along opposite sides of said cavity and perpendicular to a length of said slot, and a first protrusion and a second protrusion extending from and perpendicular to said first interior edge and said second interior edge, respectively, to form said slot, said upper portion of said body being pivotally mounted on said rod;

a shield of polarized material, for filtering said glare produced by said reflected visible light, having a first predetermined index of refraction value, a distal edge extending along an upper periphery of said shield, an upper section adjacent to said distal edge, a proximate edge extending along a lower periphery of said shield parallel to and opposite from said distal edge, and a lower section located between said proximate edge and said upper section, said shield being slidably disposed within said cavity and being movingly adjustable to a plurality of positions within said cavity relative to said body, including to an extended position with said distal edge of said shield remaining fastened in said body and a substantial portion of said shield extending through said slot and protruding from said body and a retracted position with said shield being substantially disposed within said cavity with said proximate edge protruding through said slot;

a first interlocking protrusion spaced apart from said distal edge and fixed on a first side periphery of said upper section of said shield, said first side periphery being perpendicular to said proximate edge and said distal edge, for guiding said shield along said first interior edge of said cavity and engaging said first protrusion to prevent said shield from sliding out of said cavity while located in said extended position;

a second interlocking protrusion spaced apart from said distal edge and fixed on a second side periphery of said upper section of said shield, said second side periphery being parallel to said first side periphery and perpendicular to said proximate edge and said distal edge, for guiding said shield along said second interior edge of said cavity and engaging said second protrusion to prevent said shield from sliding out of said cavity while located in said extended position;

a first spring disposed in said cavity and positioned parallel to and adjacent said first interior edge, for contacting and forcing said shield against said body to create a first frictional force between said first spring, said shield and said body to prevent said shield from sliding within said cavity under external forces not applied to said shield by said occupant;

a second spring disposed in said cavity, spaced apart from said first spring and positioned parallel to and adjacent said second interior edge, for contacting and forcing said shield against said body to create a second frictional force between said first spring, said shield and said body to prevent said shield from sliding within said cavity under external forces not applied to said shield by said occupant; and a black material exhibiting substantially five percent visible light transmittance and having a second predetermined index of refraction value higher than said first predetermined index of refraction value of said shield, said black material affixed to said shield to cover a major surface area of one side of said polarized material to protrude from said body when said shield is in said extended position, said overlapping polarized material and black material substantially inhibiting said visible light from being directly transmitted to said occupant's eyes.

10. An extendable sun glare shield as claimed in claim 9, wherein said black material comprises a sheet of film.

11. An extendable sun glare shield as claimed in claim 9, wherein said polarized material comprises a polarizing filter for filtering up to ninety-nine percent of said glare produced by said reflected visible light.

12. A sun shield, comprising:

a colored optical filter absorbent of visible sunlight impingent on said filter and having a first index of refraction within the spectrum of visible sunlight, said optical filter filtering up to ninety-nine percent of glare produced by reflection of the visible sunlight and extending between opposite lateral edges;

means for mounting said optical filter within a vehicle between an occupant of the vehicle and a windshield of the vehicle while enabling said optical filter to be manually movably positionable though a plurality of distinct orientations within a line of sight of the occupant of the vehicle through the windshield of the vehicle;

a black film exhibiting substantially five percent transmittance of light within the spectrum of visible sunlight and affixed to a major surface of said optical filter, said film extending completely across and covering a horizontal section of said major surface extending between opposite lateral edges of said optical filter to form a horizontal continuum of said film and said optical filter substantially inhibiting visible sunlight from being transmitted through the horizontal continuum to the eyes of the occupant of the vehicle while enabling the occupant to distinguish objects within the line of sight between the horizontal continuum and the sun, said film having a second index of refraction within the spectrum of visible sunlight greater than said first index of refraction of said optical filter.

13. A sun shield, comprising:

an acrylic shield comprising a colored optical filter absorbent of visible sunlight extending between opposite lateral edges of said acrylic shield and filtering up to ninety-nine percent of glare produced by reflection of visible sunlight;

means for mounting said acrylic shield within a vehicle between an occupant of the vehicle and a windshield of the vehicle while enabling said acrylic shield to be manually movably positionable though a plurality of distinct orientations within a line of sight of the occupant of the vehicle through the windshield of the vehicle;

a sheet of "LLUMAR" AT-5 SPS auto film affixed to a major surface of said acrylic shield, said film extending completely across and covering a horizontal section of said optical filter between said opposite lateral edges of said acrylic shield to form a horizontal continuum of said film and said optical filter substantially inhibiting visible sunlight from being transmitted through the horizontal continuum to the eyes of the occupant of the vehicle while enabling the occupant to view objects through the horizontal continuum in substantially the same line of sight as the sun without momentary vision impairment.

14. A sun shield, comprising:

a colored optical filter of a first material having a first index of refraction within the spectrum of visible sunlight, filtering up to ninety-nine percent of glare produced by reflection of the visible sunlight, and being absorbent of visible sunlight impingent on said filter, said optical filter having upper and lower edges and opposite lateral edges;

means for mounting said optical filter within a passenger compartment of a vehicle between an occupant of the vehicle and a windshield of the vehicle while enabling said optical filter to be manually and movably positionable through a plurality of distinct orientations within a line of sight of the occupant of the vehicle through the windshield; and a black film of a second material different from said first material having a second index of refraction greater than said first index of refraction, said film exhibiting substantially five percent transmittance of light within the spectrum of visible sunlight, said film being permanently affixed to a major surface of said optical filter, said film extending completely across and entirely covering a horizontal section of said major surface between said opposite lateral edges of said optical filter to form between said opposite lateral edges a horizontal continuum of said film and said first material substantially inhibiting visible sunlight from being transmitted through said horizontal section and into the occupant's eyes while enabling the occupant to view through said horizontal continuum and the windshield colors of light emitting objects exterior to the passenger compartment and interposed within the line of sight between said horizontal continuum and a source of the visible sunlight.

15. The sun shield of claim 14, said optical filter comprising a sheet of optical quality acrylic.

16. The sun shield of claim 14, said black film comprising a sheet of "LLUMAR" AT-5 SPS auto film.

17. The sun shield of claim 16, said optical filter comprising a sheet of optical quality acrylic.

18. The sun shield of claim 14, said optical filter comprising:

a first rigid sheet of optical quality acrylic;

a second rigid sheet of optical quality acrylic; and a polarizing filter laminated between said first sheet and said second sheet.

19. The sun shield of claim 16, said optical filter comprising:

a first rigid sheet of optical quality acrylic;

a second rigid sheet of optical quality acrylic; and a polarizing filter laminated between said first sheet and said second sheet.

20. The sun shield of claim 14, said optical filter comprising:

a first rigid sheet of optical quality plastic;

a second rigid sheet of optical quality plastic; and a polarizing filter laminated between said first sheet and said second sheet.

* * * * *